(12) United States Patent
Mori et al.

(10) Patent No.: US 10,185,482 B2
(45) Date of Patent: Jan. 22, 2019

(54) DISPLAY CONTROL DEVICE, INFORMATION DISPLAY METHOD, AND INFORMATION DISPLAY SYSTEM

(71) Applicant: MITSUBISHI ELECTRIC CORPORATION, Tokyo (JP)

(72) Inventors: Yoshihiko Mori, Tokyo (JP); Takehisa Mizuguchi, Tokyo (JP); Yoshiaki Watanabe, Tokyo (JP); Yasuaki Takimoto, Tokyo (JP); Hiroyuki Yokota, Kobe (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 14/917,829

(22) PCT Filed: Nov. 12, 2013

(86) PCT No.: PCT/JP2013/080556
§ 371 (c)(1),
(2) Date: Mar. 9, 2016

(87) PCT Pub. No.: WO2015/071961
PCT Pub. Date: May 21, 2015

(65) Prior Publication Data
US 2016/0224222 A1    Aug. 4, 2016

(51) Int. Cl.
*G09G 5/00*  (2006.01)
*G06F 3/0484*  (2013.01)
(Continued)

(52) U.S. Cl.
CPC .......... *G06F 3/04845* (2013.01); *B60K 35/00* (2013.01); *B60R 1/00* (2013.01);
(Continued)

(58) Field of Classification Search
None
See application file for complete search history.

(56) References Cited

U.S. PATENT DOCUMENTS 6,232,988 B1* 5/2001 Barlow ................ G06T 15/00
                                          345/473
7,966,123 B2* 6/2011 Watanabe ............ B60K 37/02
                                          340/439
(Continued)

FOREIGN PATENT DOCUMENTS

JP    2009-73431 A    4/2009
JP    2009-179240 A   8/2009
(Continued)

OTHER PUBLICATIONS

Purcell, "One Large Monitor vs Multiple Monitors", Oct. 20, 2010, URL:https://web.archive.org/web/20101122134454/http://www.pctechbytes.com :80/hardware/one-large-monitor-vs-multiple-monitors.*

*Primary Examiner* — David H Chu
(74) *Attorney, Agent, or Firm* — Birch, Stewart, Kolasch & Birch, LLP

(57) ABSTRACT

In the case where entertainment information is acquired as information to be displayed on an instrument panel display 1 when an object indicating driving information is displayed on the instrument panel display 1, an object indicating the entertainment information is moved from the outside of a screen of the instrument panel display 1 to the inside of the screen, and the object indicating the driving information and the object indicating the entertainment information are displayed such that all or part of the object indicating the entertainment information passes behind the object indicating the driving information during the movement.

10 Claims, 12 Drawing Sheets

(51) Int. Cl.
*B60K 35/00* (2006.01)
*B60R 1/00* (2006.01)
*G06F 3/0488* (2013.01)
*G06F 3/14* (2006.01)
*G09G 5/14* (2006.01)
*G09G 5/377* (2006.01)
*G09G 5/38* (2006.01)

(52) U.S. Cl.
CPC ........ *G06F 3/04883* (2013.01); *G06F 3/1423* (2013.01); *G09G 5/14* (2013.01); *G09G 5/377* (2013.01); *B60K 2350/1072* (2013.01); *B60K 2350/1096* (2013.01); *B60K 2350/906* (2013.01); *B60R 2300/30* (2013.01); *G06F 2203/04803* (2013.01); *G09G 5/38* (2013.01); *G09G 2354/00* (2013.01); *G09G 2360/02* (2013.01); *G09G 2380/10* (2013.01)

(56) References Cited

U.S. PATENT DOCUMENTS

| | | | | |
|---|---|---|---|---|
| 9,047,012 | B1* | 6/2015 | Bringert | G06F 3/04886 |
| 9,261,990 | B2* | 2/2016 | Choi | G06F 3/041 |
| 2003/0229441 | A1* | 12/2003 | Pechatnikov | G01C 21/26 |
| | | | | 701/411 |
| 2006/0278155 | A1* | 12/2006 | Soltendieck | B60K 37/02 |
| | | | | 116/62.4 |
| 2007/0038718 | A1* | 2/2007 | Khoo | G06Q 10/107 |
| | | | | 709/206 |
| 2007/0078598 | A1* | 4/2007 | Watanabe | B60K 37/02 |
| | | | | 701/429 |
| 2008/0161997 | A1* | 7/2008 | Wengelnik | B60K 35/00 |
| | | | | 701/36 |
| 2008/0309475 | A1 | 12/2008 | Kuno et al. | |
| 2010/0118037 | A1* | 5/2010 | Sheikh | G06T 13/80 |
| | | | | 345/473 |
| 2011/0029185 | A1* | 2/2011 | Aoki | B60K 37/06 |
| | | | | 701/31.4 |
| 2011/0090074 | A1* | 4/2011 | Kuno | B60K 35/00 |
| | | | | 340/438 |
| 2011/0163864 | A1* | 7/2011 | Watanabe | B60K 35/00 |
| | | | | 340/441 |
| 2012/0166281 | A1* | 6/2012 | Sartipi | G06F 17/3087 |
| | | | | 705/14.54 |
| 2013/0325342 | A1* | 12/2013 | Pylappan | G10L 21/00 |
| | | | | 701/533 |

FOREIGN PATENT DOCUMENTS

| | | |
|---|---|---|
| JP | 2012-83534 A | 4/2012 |
| JP | 2012-179959 A | 9/2012 |
| JP | 2013-25652 A | 2/2013 |
| WO | WO 2009/157331 A1 | 12/2009 |

\* cited by examiner

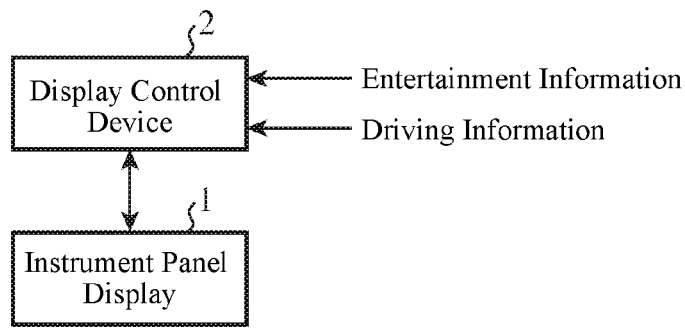
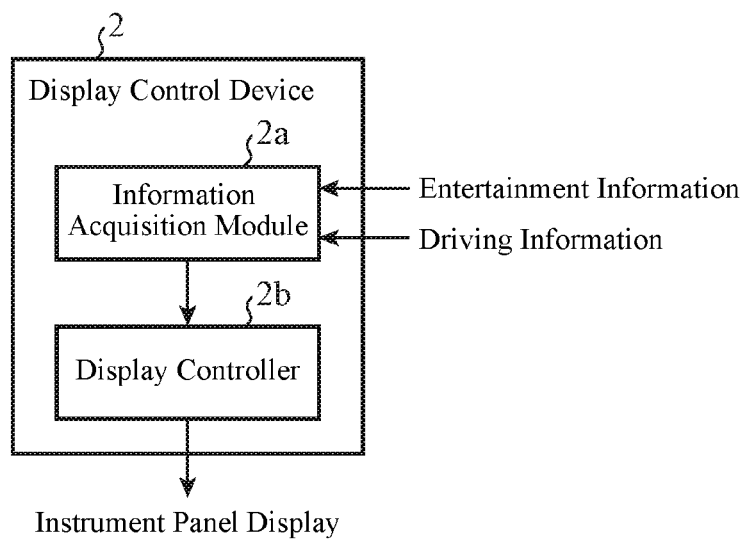
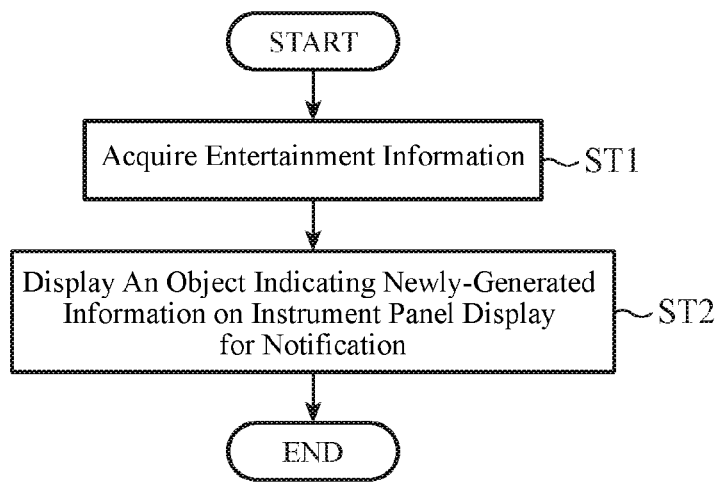

FIG.5
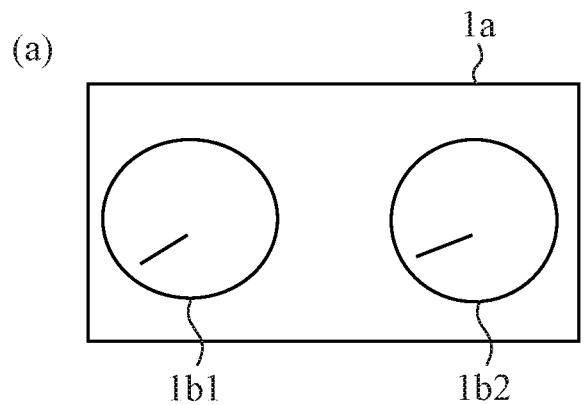
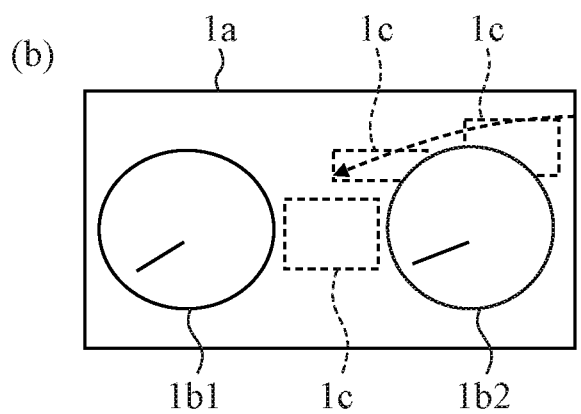
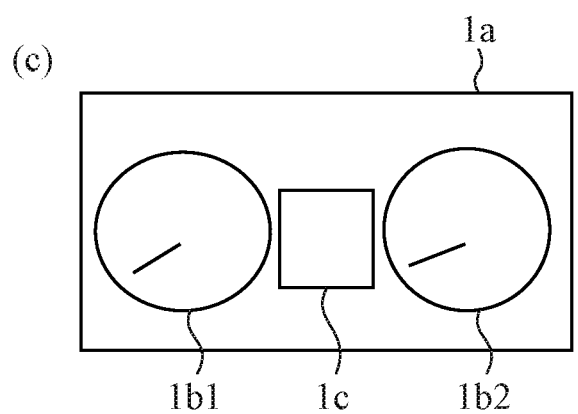

FIG.6
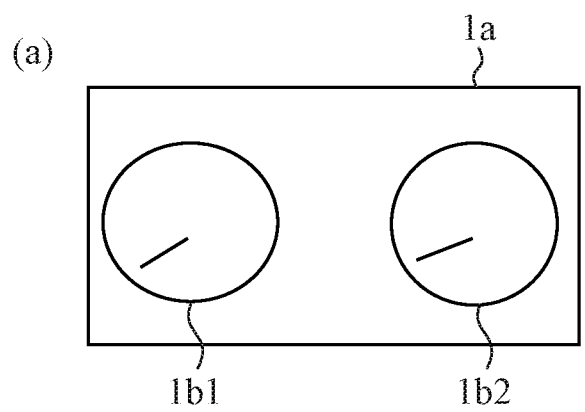
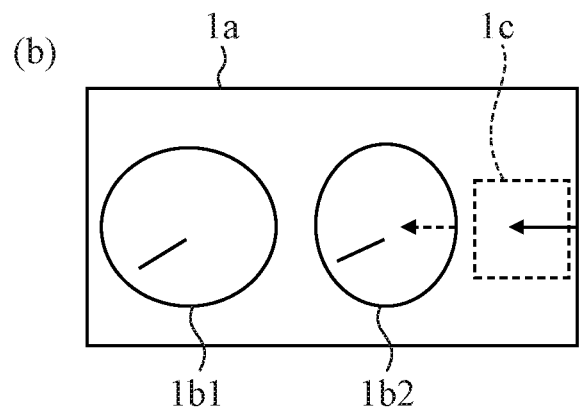
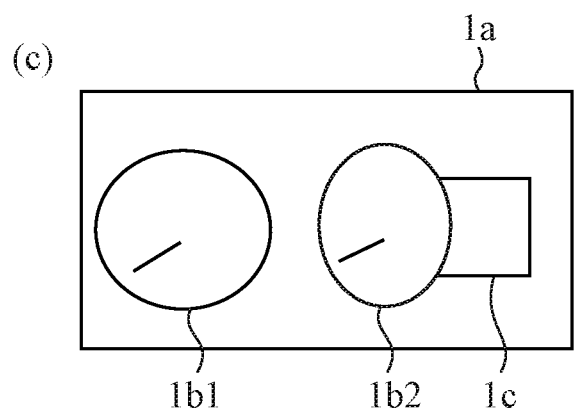

DISPLAY CONTROL DEVICE, INFORMATION DISPLAY METHOD, AND INFORMATION DISPLAY SYSTEM

FIELD OF THE INVENTION

The invention relates to a display control device, an information display method, and an information display system that display various information items using a display of an instrument panel of a vehicle.

BACKGROUND OF THE INVENTION

A recent in-vehicle system such as a navigation system, a media player system, a rear display system or the like is a complicated system in which various information processes are performed. In addition, in order to present the results of these information processes to a user such that the user can easily understand the results, it is urgent to develop an integrated information display system in which a display device is installed in an instrument panel of a vehicle and various information items are integrated and displayed.

For example, Patent Document 1 discloses a vehicle meter unit that displays meters of a vehicle. In the vehicle meter unit, when a first display mode for displaying the meters is switched to a second display mode for displaying auxiliary information, index values of the meters are continuously displayed so as not to overlap a portion displaying the auxiliary information.

RELATED ART DOCUMENT

Patent Document

Patent Document 1: Japanese Patent Application Publication No. 2009-179240

SUMMARY OF THE INVENTION

Problems to be Solved by the Invention

It is necessary to design a user interface that presents the result of the process in the in-vehicle system to the user such that the attention of the user to driving is not distracted. Accordingly, in a conventional in-vehicle system, a screen layout is often fixed in accordance with the type of information to be displayed such that the attention of a driver is not directed to the change of the screen layout.

However, in the case where the screen layout is completely fixed, it becomes difficult for the driver to notice the change of the information, and the driver cannot intuitively recognize update of the content of the information.

In addition, the screen layout is changed in response to switching of the display mode in Patent Document 1. An object indicative of information to be displayed in the first display mode and an object indicative of information to be displayed in the second display mode are displayed at positions that do not overlap each other, namely, so as to satisfy an exclusive positional relationship. For example, the screen that displays an analog speedometer image in the first display mode is changed to the screen that displays an auxiliary information outputting part such as an image of an object outside the vehicle by switching to the second display mode, and a digital speedometer image is displayed at a position that does not overlap the auxiliary information outputting part.

As described above, when the screen layout is significantly changed in response to the switching of the display mode, it is easy to grasp the change of the information, but the attention of the driver is directed to the change of the screen layout, causing a safety problem. In addition, it becomes difficult to grasp the information displayed before the change when the image is changed to the small digital speedometer image that is difficult for the driver to visually recognize.

In the case where new information to be presented to the driver occurs, it is necessary to display the occurrence of the new information such that the driver can visually recognize the occurrence easily while keeping the current screen layout as it is.

The invention has been made in order to solve the above problem, and an object of the invention is to obtain a display control device, an information display method, and an information display system capable of intuitive recognition of the content of information displayed on an in-vehicle display while maintaining safety in driving.

Means for Solving the Problem

A display control device according to the invention is a display control device mounted in a vehicle and controlling display of a display screen, and includes an information acquisition module that acquires information to be displayed on a first display device mounted in the vehicle, and a display controller that, in a case where the information acquisition module acquires second information as the information to be displayed on the first display device when an object indicating first information is displayed on the first display device, moves an object indicating the second information from an outside of a screen of the first display device to an inside of the screen, and displays the object indicating the first information and the object indicating the second information such that all or part of the object indicating the second information passes behind the object indicating the first information during the movement, or part of the object indicating the second information is overlapped with a back side of the object indicating the first information after the movement.

Advantage of the Invention

According to the invention, there is the advantage that it is possible to intuitively recognize the content of the information displayed on the in-vehicle display while maintaining the safety in driving.

BRIEF DESCRIPTION OF THE DRAWINGS

FIG. 1 is a block diagram showing a configuration of an information display system according to Embodiment 1 of the invention;

FIG. 2 is a block diagram showing a configuration of a display control device according to Embodiment 1;

FIG. 3 is a flowchart showing an operation of the display control device according to Embodiment 1;

FIG. 5 illustrates views of a screen display (Example 2) in Embodiment 1;

FIG. 6 illustrates views of a screen display (Example 3) in Embodiment 1;

EMBODIMENTS OF THE INVENTION

Figure 4:
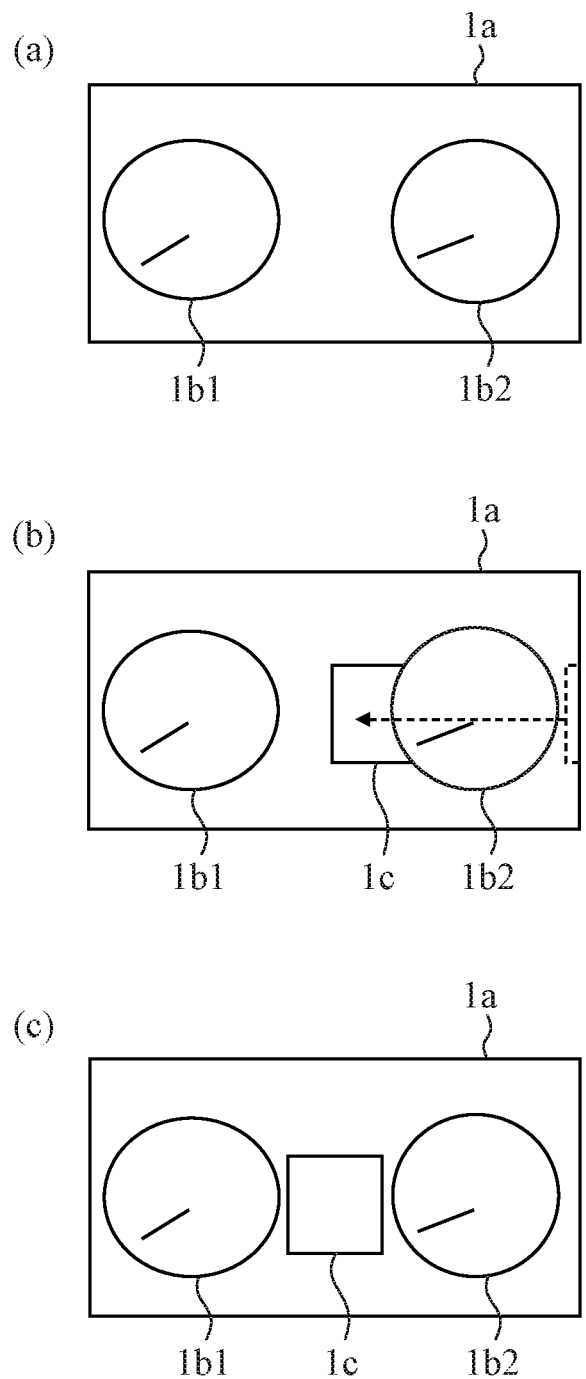
FIG. 4 illustrates views of a screen display (Example 1) in Embodiment 1.

Herein below, in order to describe the invention in greater detail, embodiments for carrying out the invention will be described according to the accompanying drawings.

Embodiment 1

FIG. 1 is a block diagram showing a configuration of an information display system according to Embodiment 1 of the invention. In FIG. 1, the information display system according to Embodiment 1 is a system that is mounted in a vehicle and displays driving conditions such as the speed of the vehicle and gearshift information on a display screen, and is configured to include an instrument panel display 1 and a display control device 2.

The instrument panel display 1 is a first display device that is installed in an instrument panel provided extending from the front of the driver's seat to the side of the passenger seat in a dashboard below a windshield of the vehicle.

On the instrument panel display 1, driving information that is used when a driver drives the vehicle is mainly displayed. The driving information is first information indicative of driving conditions of the vehicle, such as information on meters (a speedometer, a tachometer, a water temperature gauge, an air pressure indicator, a power charge indicator, a power consumption meter and the like) that indicates the driving conditions of the vehicle, the gearshift information indicative of a gear status, and/or vehicle warning information corresponding to situations inside and outside the vehicle.

The display control device 2 is a device that generates an image to be displayed on the instrument panel display 1 to control a display process, and is implemented as one function of an ECU (electronic control unit) of the vehicle.

For example, the display control device 2 generates images of meters such as the speedometer, the tachometer, the water temperature gauge, the air pressure indicator, the power charge indicator, and the power consumption meter that serve as a user interface (hereinafter abbreviated as a UI) for presenting the driving information to the driver.

FIG. 2 is a block diagram showing a configuration of the display control device according to Embodiment 1. As shown in FIG. 2, the display control device 2 includes an information acquisition module 2a and a display controller 2b.

The information acquisition module 2a is an information acquisition module that acquires information to be displayed on the instrument panel display 1. For example, the information acquisition module 2a acquires vehicle information inputted from the electronic control unit of the vehicle via a CAN (controller area network) bus as the information to be displayed on the instrument panel display 1, and outputs the information to the display controller 2b.

In addition, the information acquisition module 2a acquires entertainment information received from external equipment via short range wireless communication by performing the short range wireless communication such as Bluetooth (registered trademark; hereinafter this description will be omitted) with the external equipment mounted in the vehicle as second information to be displayed on the instrument panel display 1.

In this regard, the entertainment information is information on entertainment such as a movie, television, music, radio, Internet information, e-mail information, navigation information, and an image of an object outside the vehicle, which are processed in the above external equipment.

The display controller 2b is a display controller that controls the display on the display screen of the instrument panel display 1. For example, in the case where the information acquisition module 2a acquires the entertainment information as the information to be displayed on the instrument panel display 1 when an object indicating the driving information is displayed on the instrument panel display 1, the display controller 2b moves an object indicating the entertainment information from the outside of the screen of the instrument panel display 1 to the inside of the screen.

The display controller 2b displays the object indicating the driving information and the object indicating the entertainment information such that all or part of the object indicating the entertainment information passes behind the object indicating the driving information during the movement, or part of the object indicating the entertainment information is overlapped with the back side of the object indicating the driving information after the movement.

In the case where the object indicating the first information and the object indicating the second information are displayed such that all or part of the object indicating the second information passes behind the object indicating the first information, it is assumed that the first information is information having a priority in safe driving higher than that of the second information. That is, the driving information indicative of the driving conditions of the vehicle corresponds to the first information, and the entertainment information irrelevant to the driving conditions corresponds to the second information. With this, when a notification is made by displaying new information on the instrument panel display 1, it is possible to prevent the viewability of the object indicating the information having a high priority in safe driving from being spoiled.

The information acquisition module 2a and the display controller 2b are implemented by execution of a program in which a process peculiar to the invention is written by a microcomputer as specific units in which hardware and software cooperate with each other.

Next, an operation will be described.

FIG. 3 is a flowchart showing the operation of the display control device according to Embodiment 1.

First, the information acquisition module 2a acquires the entertainment information as the information to be displayed on the instrument panel display 1 when the object indicating the driving information is displayed on the instrument panel display 1 (Step ST1). For example, in the case where an e-mail addressed to the driver has arrived when the image of the meters of the vehicle is displayed on the instrument panel display 1, the information acquisition module 2*a* acquires the e-mail as the information to be displayed on the instrument panel display 1 in order to notify the driver of the e-mail.

In the case where the information acquisition module 2*a* acquires the entertainment information as the information to be displayed on the instrument panel display 1 in the manner described above, the display controller 2*b* displays the object indicating the entertainment information on the instrument panel display 1 for notification to the driver (Step ST2). For example, in the case where the entertainment information is information on the arrival of the e-mail, the display controller 2*b* displays an icon image indicative of the e-mail on the instrument panel display 1.

FIG. 4 illustrates views of a screen display in Embodiment 1, and shows one of modes for displaying new information of which the driver is to be notified on the instrument panel display 1.

In FIG. 4(*a*), the display controller 2*b* displays meter images 1*b*1 and 1*b*2 on a screen 1*a* of the instrument panel display 1. In this state, the information acquisition module 2*a* acquires the entertainment information as the information to be displayed on the instrument panel display 1.

In the case where the information acquisition module 2*a* acquires the entertainment information when the meter images 1*b*1 and 1*b*2 are displayed on the screen 1*a* of the instrument panel display 1 in the manner described above, as indicated by an arrow in FIG. 4 (*b*), the display controller 2*b* moves an object 1*c* indicating the entertainment information from the outside of the screen of the instrument panel display 1 to the inside of the screen.

At this point, as shown in FIG. 4(*b*), the display controller 2*b* causes the instrument panel display 1 to display the object 1*b*2 indicating the driving information and the object 1*c* indicating the entertainment information such that all of the object 1*c* indicating the entertainment information passes behind the object 1*b*2 indicating the driving information. It is noted that the instrument panel display 1 may also be caused to display the object 1*b*2 and the object 1*c* such that part of the object 1*c* passes behind the object indicating the driving information during the movement.

For example, the display controller 2*b* sets a first display layer for displaying the meter images 1*b*1 and 1*b*2 of the driving information and a second display layer for displaying the object 1*c* indicating the entertainment information, and controls the first and second display layers such that the first display layer is positioned over the second display layer as viewed from the driver. Next, the display controller 2*b* moves the object 1*c* in the screen of the instrument panel display 1 along a display path in which all or part of the object 1*c* passes behind the meter image 1*b*2 of the driving information.

Thereafter, as shown in FIG. 4(*c*), the display controller 2*b* moves the object 1*c* indicating the entertainment information to a set position in the screen of the instrument panel display 1, and displays the object 1*c*.

It is noted that the display controller 2*b* may search the screen of the instrument panel display 1 for a space in which the entire object 1*c* can be displayed and determine the space as the set position, or the display controller 2*b* may also determine a position specified by the user in advance as the set position.

In addition, a position at which part of the object 1*c* is overlapped with the back side of either of the objects 1*b*1 and 1*b*2 of the driving information may be determined as the set position.

The driver can intuitively recognize the content of the information by sighting a state in which the object indicating new information moves from the outside of the screen of the instrument panel display 1 to the inside of the screen and passes behind the existing object.

In addition, the object indicating the driving information already displayed on the instrument panel display 1 does not change, and hence the screen layout is not significantly changed due to update of the display content.

Consequently, it is possible to prevent the attention of the driver from being extremely spoiled due to the change of the screen layout, and to maintain safety in driving.

FIG. 5 illustrates views of a screen display in Embodiment 1, and shows another example of the mode for displaying new information of which the driver is to be notified on the instrument panel display 1.

In FIG. 5(*a*), similarly to FIG. 4(*a*), the display controller 2*b* displays the meter images 1*b*1 and 1*b*2 on the screen 1*a* of the instrument panel display 1. In this state, the information acquisition module 2*a* acquires the entertainment information as the information to be displayed on the instrument panel display 1.

In the case where the information acquisition module 2*a* acquires the entertainment information when the meter images 1*b*1 and 1*b*2 are displayed on the screen 1*a* of the instrument panel display 1 in the manner described above, as indicated by an arrow in FIG. 5(*b*), the display controller 2*b* moves the object 1*c* indicating the entertainment information from the outside of the screen of the instrument panel display 1 to the inside of the screen.

At this point, as shown in FIG. 5(*b*), the display controller 2*b* transforms the object 1*c* indicating the entertainment information, and moves the object 1*c* in the screen of the instrument panel display 1 such that part of the object 1*c* passes behind the object 1*b*2 indicating the driving information. For example, the object 1*c* moves along the outer edge of the object (meter image) 1*b*2 indicating the driving information while shrinking so as to fit in the screen.

Thereafter, as shown in FIG. 5(*c*), the display controller 2*b* moves the object 1*c* indicating the entertainment information to the set position in the screen of the instrument panel display 1, then restores the shape of the object 1*c* to the original shape, and displays the object 1*c*.

It is noted that the display controller 2*b* may search the screen of the instrument panel display 1 for a space in which the entire object 1*c* can be displayed and determine the space as the set position, or the display controller 2*b* may also determine a position specified by the user in advance as the set position.

In addition, a position at which part of the object 1*c* is overlapped with the back side of either of the objects 1*b*1 and 1*b*2 indicating the driving information may be determined as the set position.

The driver can intuitively recognize the content of the information by sighting a state in which the object indicating the new information moves from the outside of the screen to the inside of the screen, the object transforms, and part of the object passes behind the existing object.

In addition, the object indicating the driving information already displayed on the instrument panel display 1 does not change, and hence the screen layout is not significantly changed due to the update of the display content.

Consequently, it is possible to prevent the attention of the driver from being extremely spoiled due to the change of the screen layout, and to maintain the safety in driving.

FIG. 6 illustrates views of a screen display in Embodiment 1, and shows still another example of the mode for displaying new information of which the driver is to be notified on the instrument panel display 1.

In FIG. 6(a), similarly to FIG. 4(a), the display controller 2b displays the meter images 1b1 and 1b2 on the screen 1a of the instrument panel display 1. In this state, the information acquisition module 2a acquires the entertainment information as the information to be displayed on the instrument panel display 1.

In the case where the information acquisition module 2a acquires the entertainment information when the meter images 1b1 and 1b2 are displayed on the screen 1a of the instrument panel display 1 in the manner described above, as indicated by an arrow in FIG. 6(b), the display controller 2b moves the object 1c indicating the entertainment information from the outside of the screen of the instrument panel display 1 to the inside of the screen. At this point, as shown in FIG. 6(b), the display controller 2b transforms and moves the object 1b2 indicating the driving information such that the object 1b2 retreats in response to the approach of the object 1c indicating the entertainment information.

Thereafter, as shown in FIG. 6(c), the display controller 2b displays the object 1b2 and the object 1c such that part of the object 1c indicating the entertainment information is overlapped with the back side of the object 1b2 indicating the driving information after the transformation.

The driver can intuitively recognize the content of the information by sighting a state in which the object indicating the new information moves from the outside of the screen to the inside of the screen, and the existing object transforms in response to the movement.

In addition, the object indicating the driving information only moves and transforms to such a degree that part of the object indicating the new information is overlapped with the back side, and hence the screen layout is not significantly changed due to the update of the display content. Consequently, it is possible to prevent the attention of the driver from being extremely spoiled due to the change of the screen layout, and to maintain the safety in driving.

As described above, according to Embodiment 1, there are provided the information acquisition module 2a that acquires the information to be displayed on the instrument panel display 1 mounted in the vehicle, and the display controller 2b that, in the case where the information acquisition module 2a acquires the entertainment information as the information to be displayed on the instrument panel display 1 when the objects 1b1 and 1b2 indicating the driving information are displayed on the instrument panel display 1, moves the object 1c indicating the entertainment information from the outside of the screen of the instrument panel display 1 to the inside of the screen, and displays the objects 1b1 and 1b2 and the object 1c such that all or part of the object 1c indicating the entertainment information passes behind the objects 1b1 and 1b2 indicating the driving information during the movement, or part of the object 1c indicating the entertainment information is overlapped with the back sides of the objects 1b1 and 1b2 indicating the driving information after the movement. With this configuration, it is possible to intuitively recognize the content of the information displayed on the instrument panel display 1 while maintaining the safety in driving.

In addition, according to Embodiment 1, the display controller 2b transforms the object 1c indicating the entertainment information, moves the object 1c in the screen of the instrument panel display 1 such that part of the object 1c passes behind the objects 1b1 and 1b2 indicating the driving information, then restores the shape of the object 1c to the original shape, and displays the object 1c. With this configuration, the driver can intuitively recognize the update of the content of the information displayed on the instrument panel display 1 by sighting a state in which the object indicating the new information moves from the outside of the screen to the inside of the screen, the object transforms, and part of the object passes behind the existing object. Additionally, the screen layout is not significantly changed due to the update of the content of the information so that it is possible to prevent the attention of the driver from being extremely spoiled. With this, it is possible to maintain the safety in driving.

Further, according to Embodiment 1, the display controller 2b transforms and moves the objects 1b1 and 1b2 indicating the driving information such that the objects 1b1 and 1b2 retreat in response to the approach of the object 1c indicating the entertainment information, and displays the objects 1b1 and 1b2 and the object 1c such that part of the object 1c indicating the entertainment information is overlapped with the back sides of the objects 1b1 and 1b2 indicating the driving information after the transformation.

With this configuration, the driver can intuitively recognize the update of the content of the information displayed on the instrument panel display 1 by sighting a state in which the object indicating the new information moves from the outside of the screen to the inside of the screen and the existing object transforms in response to the movement.

In addition, the screen layout is not significantly changed due to the update of the content of the information so that it is possible to prevent the attention of the driver from being extremely spoiled. With this, it is possible to maintain the safety in driving.

Further, according to Embodiment 1, the first information such as the driving information is information having the priority in safe driving higher than that of the second information such as the entertainment information. With this, when the notification is made by displaying the second information on the instrument panel display 1, it is possible to prevent the viewability of the object indicating the first information having the higher priority in safe driving from being spoiled.

Embodiment 2

Figure 7:
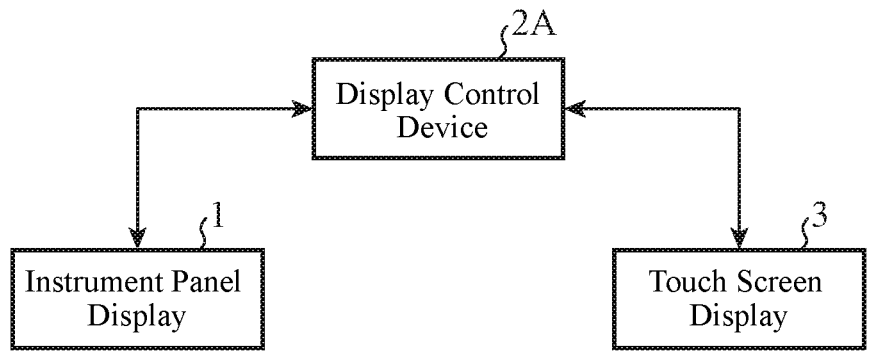
FIG. 7 is a block diagram showing a configuration of an information display system according to Embodiment 2 of the invention.

FIG. 7 is a block diagram showing a configuration of an information display system according to Embodiment 2 of the invention. In FIG. 7, the information display system according to Embodiment 2 is a system that is mounted in the vehicle and displays driving conditions such as the speed of the vehicle and the gearshift information on the display screen, and is configured to include the instrument panel display 1, a display control device 2A, and a touch screen display 3. In this regard, the instrument panel display 1 is the same as that in FIG. 1, and hence the descriptions thereof will be omitted.

The touch screen display 3 is a second display device that is connected to the display control device 2A in a wired or wireless manner and is provided with a touch panel on the display screen. The touch screen display 3 is implemented by, e.g., a mobile terminal brought into the vehicle by a passenger of the vehicle and mounted in the vehicle such as a tablet or a smartphone, or a display of in-vehicle equipment provided in the vehicle, and mainly displays the entertainment information.

The display control device 2A is a display device that is mounted in the vehicle and controls the display of the display screen of the touch screen display 3 in addition to the instrument panel display 1.

For example, the display control device 2A generates a navigation image (navigation information) required for travel guidance of the vehicle and various menu images (navigation control UI) related to the travel guidance that serve as a UI for the entertainment information and for presenting the entertainment information to the driver.

In addition, the display control device 2A generates various menu images (digital music playback control UI) used in audio playback, an image of information (digital music playback information) indicative of an audio playback status, various menu images (digital video playback control UI) used in video playback, and an image of information (digital video playback information) indicative of a video playback status.

Further, the display control device 2A also generates various menu images (in-vehicle camera display control UI) used in, for instance, display control of an in-vehicle camera, and images (in-vehicle camera display information) taken by the in-vehicle camera.

Figure 8:
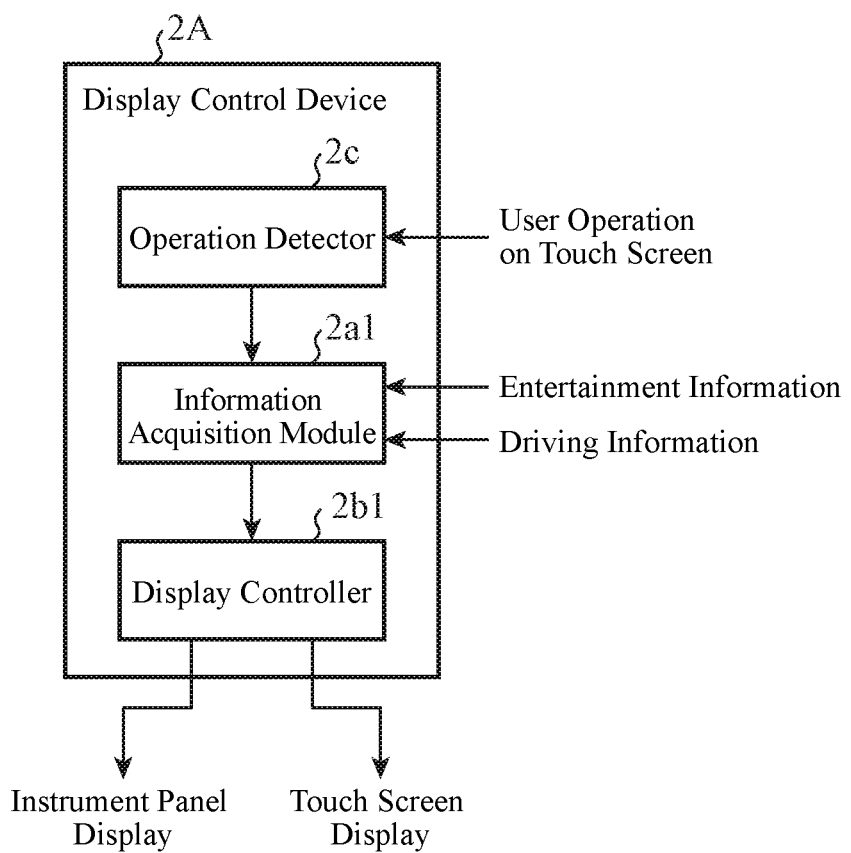
FIG. 8 is a block diagram showing a configuration of a display control device according to Embodiment 2.

FIG. 8 is a block diagram showing a configuration of the display control device according to Embodiment 2. As shown in FIG. 8, the display control device 2A includes an information acquisition module 2a1, a display controller 2b1, and an operation detector 2c. The information acquisition module 2a1 is an information acquisition module that acquires information to be displayed on the instrument panel display 1 and the touch screen display 3. For example, similarly to Embodiment 1, the information acquisition module 2a1 acquires the driving information inputted from the electronic control unit of the vehicle via the CAN bus as the information to be displayed on the instrument panel display 1, and outputs the driving information to the display controller 2b1.

In addition, the information acquisition module 2a1 acquires the entertainment information as the information to be displayed on the instrument panel display 1 or the touch screen display 3.

In this regard, similarly to Embodiment 1, the entertainment information is information on entertainment such as a movie, television, music, radio, Internet information, e-mail information, navigation information, and a vehicle outside video that are processed in the above external equipment.

The display controller 2b1 is a display controller that controls the display of the display screens of the instrument panel display 1 and the touch screen display 3.

For example, in the case where the information acquisition module 2a1 acquires information displayed on the touch screen display 3 as the entertainment information to be displayed on the instrument panel display 1 when the object indicating the driving information is displayed on the instrument panel display 1, the display controller 2b1 moves the object indicating the entertainment information from the outside of the screen of the instrument panel display 1 to the inside of the screen. Further, the display controller 2b1 displays the object indicating the driving information and the object indicating the entertainment information such that all or part of the object indicating the entertainment information passes behind the object indicating the driving information during the movement, or part of the object indicating the entertainment information is overlapped with the back side of the object indicating the driving information after the movement.

The operation detector 2c is an operation detector that detects an operation from the outside, and detects, e.g., the operation of the touch panel of the touch screen display 3.

In addition, the operation detector 2c may detect the operation of the external equipment connected to the display control device 2A in a wired or wireless manner. For example, in the case where the external equipment is audio equipment, the operation detector 2c detects a music playback operation.

The information acquisition module 2a1, the display controller 2b1, and the operation detector 2c are implemented by execution of a program in which a process peculiar to the invention is written by a microcomputer as specific units in which hardware and software cooperate with each other.

Next, an operation will be described.

Figure 9:
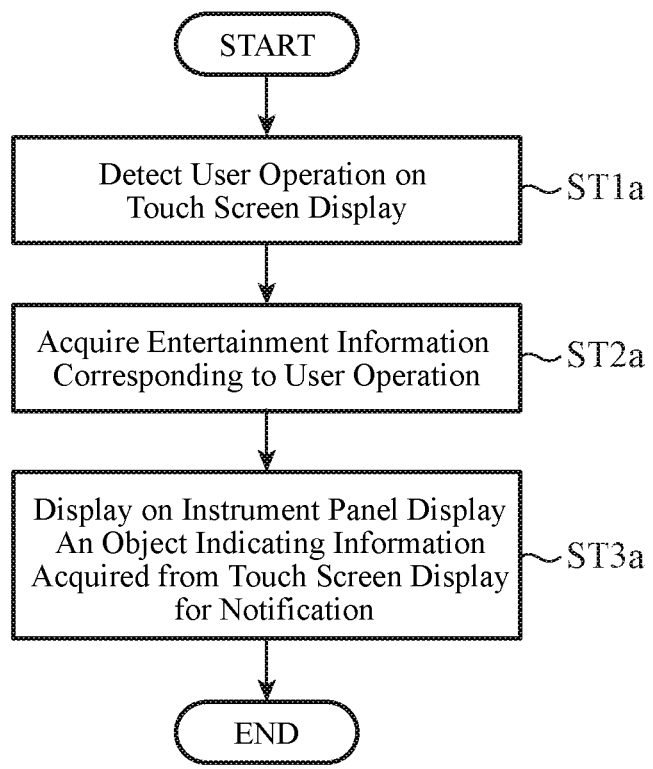
FIG. 9 is a flowchart showing an operation of the display control device according to Embodiment 2.

FIG. 9 is a flowchart showing the operation of the display control device according to Embodiment 2.

First, the operation detector 2c detects a user operation in the touch screen display 3 (Step ST1a).

Next, the information acquisition module 2a1 acquires the entertainment information displayed on the touch screen display 3 as information corresponding to the operation detected by the operation detector 2c (Step ST2a). For example, in response to a flick operation to an album jacket image displayed on the touch screen display 3, the information acquisition module 2a1 acquires information on the album jacket image displayed on the touch screen display 3.

In the case where the information acquisition module 2a1 acquires the entertainment information displayed on the touch screen display 3 as the information to be displayed on the instrument panel display 1 when the object indicating the driving information is displayed on the instrument panel display 1, the display controller 2b1 displays the object indicating the entertainment information on the instrument panel display 1 for notification to the driver (Step ST3a). For example, among information items displayed on the touch screen display 3, the display controller 2b1 displays the album jacket image corresponding to the flick operation on the instrument panel display 1.

Figure 10:
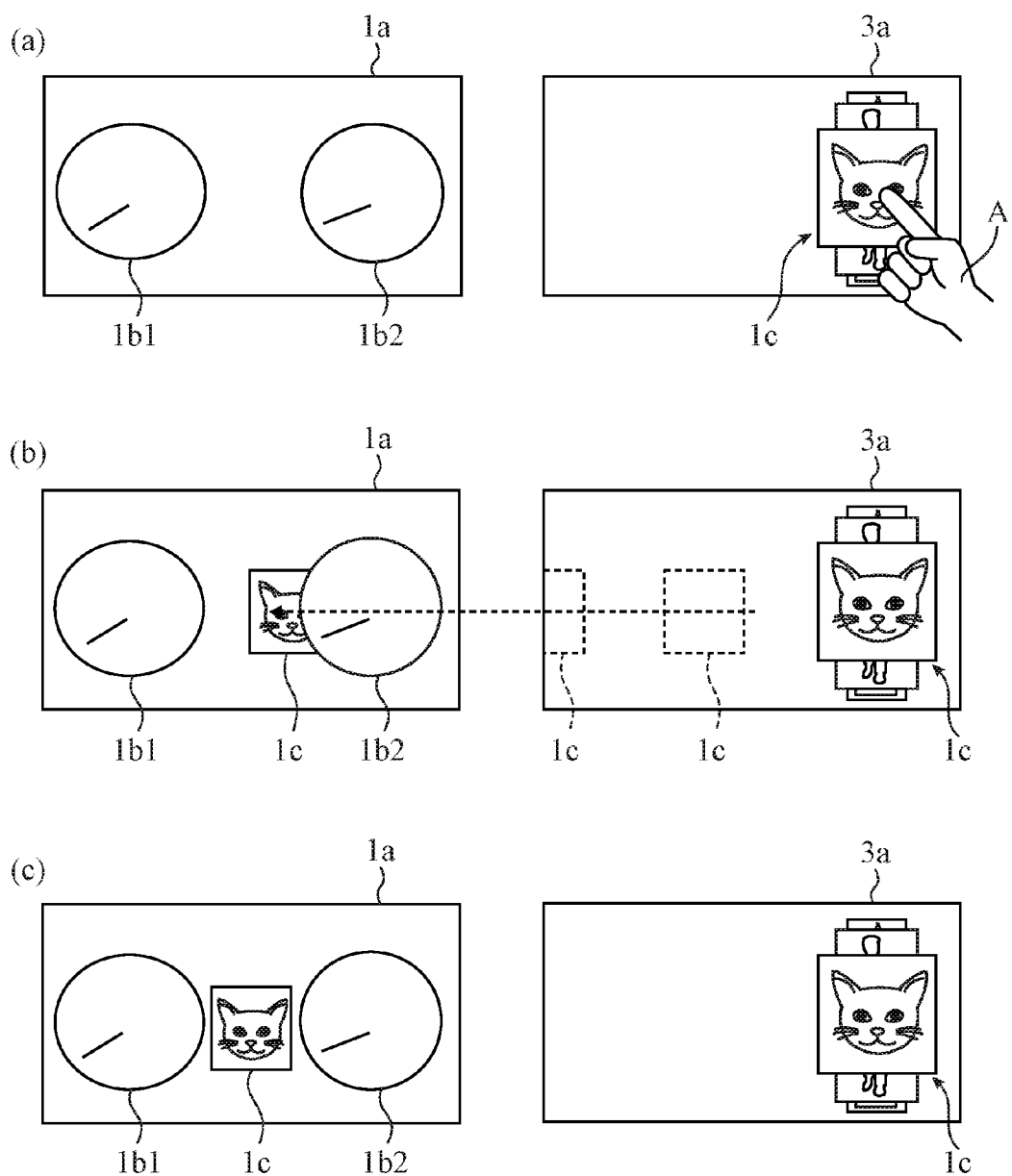
FIG. 10 illustrates views of a screen display (Example 1) in Embodiment 2.

FIG. 10 illustrates views of a screen display in Embodiment 2, and shows a mode for displaying the information displayed on the touch screen display 3 on the instrument panel display 1 in response to the flick operation. In addition, in FIG. 10, it is assumed that the touch screen display 3 is in-vehicle audio equipment (display audio).

In FIG. 10(a), the display controller 2b1 displays the meter images 1b1 and 1b2 on the screen 1a of the instrument panel display 1. In addition, the display controller 2b1 displays a playback album selection screen 3a for selecting the album to be played back on the touch screen display 3. At this point, when a user A performs the flick operation on the album jacket image of the playback album selection screen 3a to select the album, the audio equipment having the touch screen display 3 changes digital music during playback to digital music of the selected album, and starts the playback. When the flick operation is detected by the operation detector 2c, the information acquisition module 2b1 acquires the entertainment information corresponding to the flick operation as the second information to be displayed on the instrument panel display 1.

In the case where the information acquisition module 2a1 acquires the entertainment information when the meter images 1b1 and 1b2 are displayed on the screen 1a of the instrument panel display 1 in the manner described above, as indicated by an arrow in FIG. 10(b), the display controller 2b1 moves the object indicating the entertainment information (hereinafter referred to as an album jacket image) 1c from the inside of the screen of the touch screen display 3 to the outside of the screen, and further moves the album jacket image 1c from the outside of the screen of the instrument panel display 1 to the inside of the screen. At this point, as shown in FIG. 10(b), in the screen of the instrument panel display 1, the display controller 2b1 displays the object 1b2 and the album jacket image 1c such that all of the album jacket image 1c passes behind the object 1b2 indicating the driving information. In this regard, the display controller 2b1 may display the object indicating the driving information and the album jacket image 1c such that part of the album jacket image 1c passes behind the object indicating the driving information during the movement.

For example, the display controller 2b1 sets the first display layer for displaying the meter images 1b1 and 1b2 of the driving information and the second display layer for displaying the album jacket image 1c, and controls the first and second display layers such that the first display layer is positioned over the second display layer as viewed from the driver. Subsequently, the display controller 2b1 moves the album jacket image 1c in the screen of the instrument panel display 1 along a display path in which all or part of the album jacket image 1c passes behind the meter image 1b2.

Thereafter, as shown in FIG. 10(c), the display controller 2b1 moves the album jacket image 1c to the set position in the screen of the instrument panel display 1 and displays the album jacket image 1c.

In this regard, the display controller 2b1 may search the screen of the instrument panel display 1 for a space in which the entire album jacket image 1c can be displayed and determine the space as the set position, or the display controller 2b1 may also determine a position specified by the user in advance as the set position.

In addition, a position at which part of the album jacket image 1c is overlapped with the back side of either of the meter images 1b1 and 1b2 of the driving information may be determined as the set position.

The driver can intuitively recognize the content of the information indicative of which album music the digital music during the playback is changed to at which timing by sighting a state in which the album jacket image 1c moves over the two displays 1 and 3 that are physically spaced apart from each other, and passes behind the existing objects (the meter images 1b1 and 1b2).

In addition, the objects (the meter images 1b1 and 1b2) indicating the driving information already displayed on the instrument panel display 1 do not change, and hence the screen layout is not significantly changed due to the update of the display content. Consequently, the attention of the driver is not excessively spoiled due to the change of the screen layout so that it is possible to maintain the safety in driving.

Figure 11:
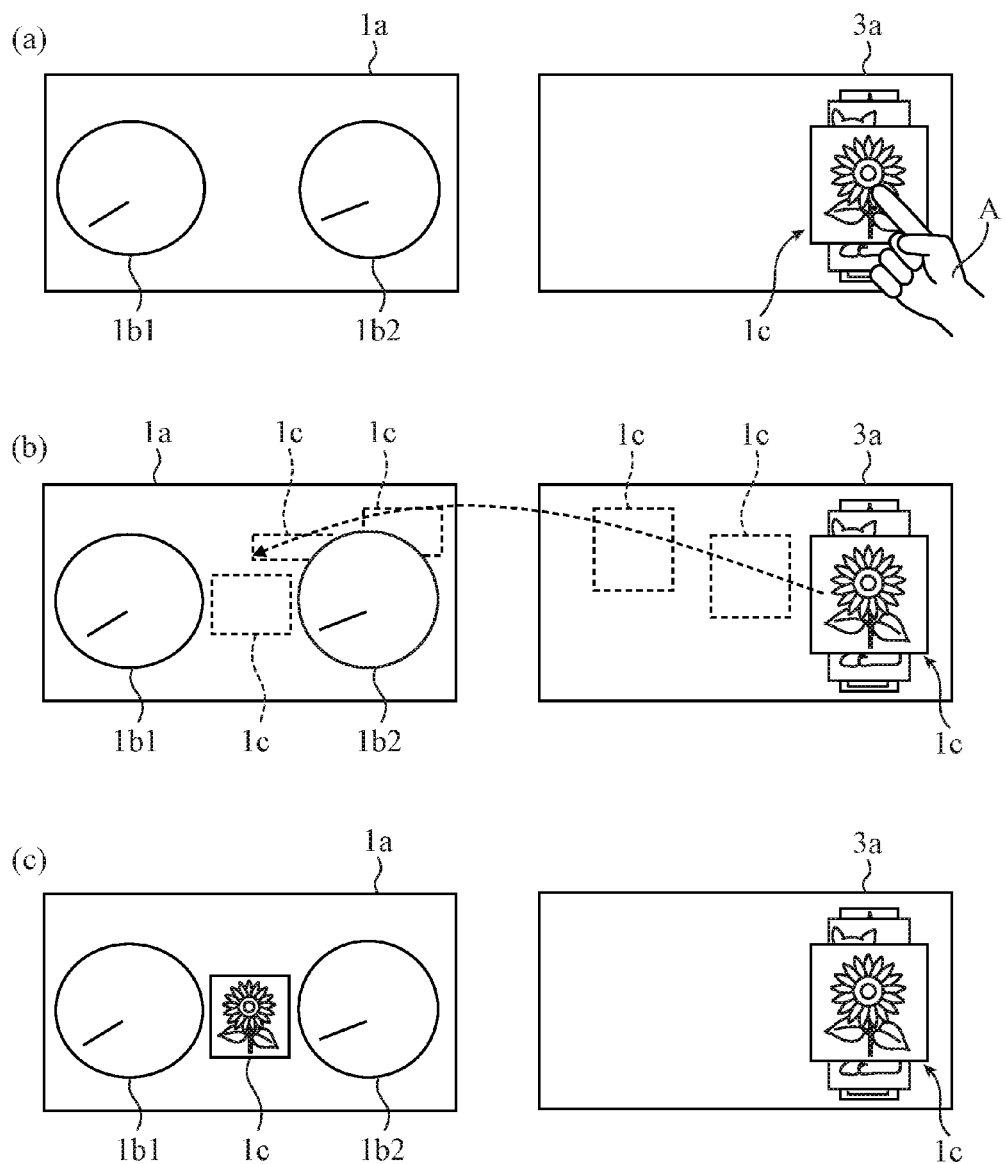
FIG. 11 illustrates views of a screen display (Example 2) in Embodiment 2.

FIG. 11 illustrates views of a screen display in Embodiment 2, and shows the mode for displaying the information displayed on the touch screen display 3 on the instrument panel display 1 in response to the flick operation. In addition, in FIG. 11, similarly to FIG. 10, it is assumed that the touch screen display 3 is the in-vehicle audio equipment (display audio).

In FIG. 11(a), similarly to FIG. 10(a), the display controller 2b1 displays the meter images 1b1 and 1b2 on the screen 1a of the instrument panel display 1. In addition, the display controller 2b1 displays the playback album selection screen 3a for selecting the album to be played back on the touch screen display 3. At this point, when the user A performs the flick operation on the album jacket image of the playback album selection screen 3a to select the album, the audio equipment having the touch screen display 3 changes the digital music during the playback to the digital music of the selected album, and starts the playback. When the operation detector 2c detects the flick operation, the information acquisition module 2b1 acquires the entertainment information corresponding to the flick operation as the second information to be displayed on the instrument panel display 1.

In the case where the information acquisition module 2a1 acquires the entertainment information when the meter images 1b1 and 1b2 are displayed on the screen 1a of the instrument panel display 1 in the manner described above, as indicated by an arrow in FIG. 11 (b), the display controller 2b moves the object indicating the entertainment information (hereinafter referred to as the album jacket image) 1c from the inside of the screen of the touch screen display 3 to the outside of the screen, and further moves the album jacket image 1c from the outside of the screen of the instrument panel display 1 to the inside of the screen. At this point, as shown in FIG. 11(b), the display controller 2b1 transforms the album jacket image 1c, and moves the album jacket image 1c in the screen of the instrument panel display 1 such that part of the album jacket image 1c passes behind the object 1b2 indicating the driving information. For example, the album jacket image 1c moves along the outer edge of the object (meter image) 1b2 indicating the driving information while shrinking so as to fit in the screen. Note that the display controller 2b1 may display the object indicating the driving information and the album jacket image 1c such that part of the album jacket image 1c passes behind the object indicating the driving information during the movement.

Thereafter, as shown in FIG. 11 (c), the display controller 2b1 moves the album jacket image 1c to the set position in the screen of the instrument panel display 1, then restores the shape of the album jacket image 1c to the original shape, and displays the album jacket image 1c. In this regard, the display controller 2b1 may search the screen of the instrument panel display 1 for a space in which the entire album jacket image 1c can be displayed and determine the space as the set position, or the display controller 2b1 may also determine a position specified by the user in advance as the set position.

In addition, a position at which part of the album jacket image 1c is overlapped with the back side of either of the objects 1b1 and 1b2 indicating the driving information may be determined as the set position.

The driver can intuitively recognize the content of the information indicative of which album music the digital music during the playback is changed to at which timing by sighting a state in which the album jacket image 1c moves over the two displays 1 and 3 that are physically spaced apart from each other, transforms during the movement, and part of the album jacket image 1c passes behind the existing objects (the meter images 1b1 and 1b2).

In addition, the objects (the meter images 1b1 and 1b2) indicating the driving information already displayed on the instrument panel display 1 do not change, and hence the screen layout is not significantly changed due to the update of the display content. Consequently, the attention of the driver is not extremely spoiled due to the change of the screen layout so that it is possible to maintain the safety in driving.

Figure 12:
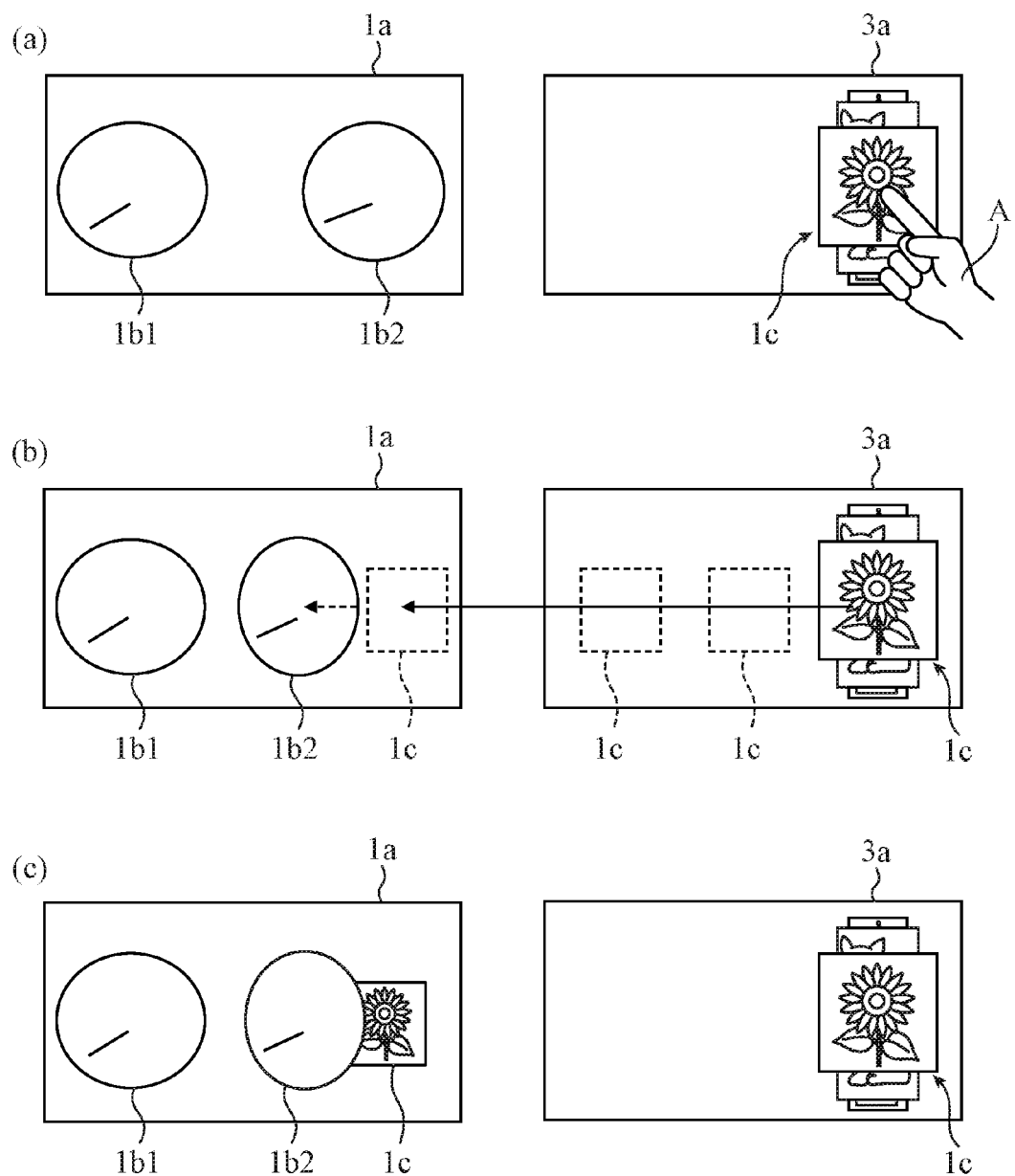
FIG. 12 illustrates views of a screen display (Example 3) in Embodiment 2.

FIG. 12 illustrates views of a screen display in Embodiment 2, and shows the mode for displaying the information displayed on the touch screen display 3 on the instrument panel display 1 in response to the flick operation. In addition, in FIG. 12, similarly to FIG. 10, it is assumed that the touch screen display 3 is the in-vehicle audio equipment (display audio).

In FIG. 12(a), similarly to FIG. 10(a), the display controller 2b1 displays the meter images 1b1 and 1b2 on the screen 1a of the instrument panel display 1. In addition, the display controller 2b1 displays the playback album selection screen 3a for selecting the album to be played back on the touch screen display 3. At this point, when the user A performs the flick operation on the album jacket image of the playback album selection screen 3a to select the album, the audio equipment having the touch screen display 3 changes the digital music during the playback to the digital music of the selected album, and starts the playback. When the operation detector 2c detects the flick operation, the information acquisition module 2b1 acquires the entertainment information corresponding to the flick operation as the second information to be displayed on the instrument panel display 1.

In the case where the information acquisition module 2a1 acquires the entertainment information when the meter images 1b1 and 1b2 are displayed on the screen 1a of the instrument panel display 1 in the manner described above, as indicated by an arrow in FIG. 12 (b), the display controller 2b moves the object indicating the entertainment information (hereinafter referred to as the album jacket image) 1c from the inside of the screen of the touch screen display 3 to the outside of the screen, and further moves the album jacket image 1c from the outside of the screen of the instrument panel display 1 to the inside of the screen. At this point, as indicated by an arrow in FIG. 12(b), the display controller 2b1 transforms and moves the object 1b2 indicating the driving information such that the object 1b2 retreats in response to the approach of the album jacket image 1c. Thereafter, as shown in FIG. 12(c), the display controller 2b1 displays the object 1b2 and the album jacket image 1c such that part of the album jacket image 1c is overlapped with the back side of the object 1b2 indicating the driving information after the transformation.

The driver can intuitively recognize the content of the information indicative of which album music the digital music during the playback is changed to at which timing by sighting a state in which the album jacket image 1c moves from the outside of the screen to the inside of the screen, and the existing object (the meter image 1b2) transforms in response to the movement.

In addition, the object indicating the driving information (the meter image 1b2) only moves and transforms to such a degree that part of the album jacket image 1c is overlapped with the back side, and hence the screen layout is not significantly changed due to the update of the display content.

Consequently, it is possible to prevent the attention of the driver from being extremely spoiled due to the change of the screen layout, and to maintain the safety in driving.

It is noted that the above description has described the case where the information acquisition module 2a1 acquires the album playback information as the entertainment information to be displayed on the instrument panel display 1 in response to the detection of the flick operation to the touch screen display 3 by the operation detector 2c. However, the invention is not limited thereto.

For example, at a timing after the album to be played back is changed with the flick operation and a set time period has elapsed from the start of the playback of the music of the album, the information acquisition module 2a1 may acquire the album playback information on the album, and the display controller 2b1 may display the album jacket image 1c on the instrument panel display 1.

Thus, by acquiring the new information to be displayed on the instrument panel display 1 at a set time lapse from the occurrence of a predetermined event such as the music playback of the album, it is possible to cause the driver to accurately recognize the content of the event (the album after the change or the like). In this case, even when the user A selects the album that the driver does not intend to select by mistake, it is possible for the driver to determine success or failure of the selection after listening to the music after the selection.

In addition, the information acquisition module 2a1 may acquire the entertainment information to be displayed on the instrument panel display 1 in response to a change in the state of a predetermined function.

For example, in the playback function of the digital music, at a timing at which the end of playback of the digital music during the playback is detected or at a timing at which the volume of the digital music during the playback exceeds a threshold value, the information acquisition module 2a1 acquires playback information on the album to be played back next as the new information to be displayed on the instrument panel display 1. With this, it is possible to make the notification by displaying the playback information on the album to be played back next on the instrument panel display 1 irrespective of the operation of the user A.

As described above, according to Embodiment 2, the information acquisition module 2a1 acquires the information to be displayed on the touch screen display 3 mounted in the vehicle in addition to the instrument panel display 1 and, in the case where the information acquisition module 2a1 acquires the information displayed on the touch screen display 3 as the entertainment information when the object indicating the driving information is displayed on the instrument panel display 1, the display controller 2b1 moves the object indicating the entertainment information from the outside of the screen of the instrument panel display 1 to the inside of the screen, and displays the object indicating the driving information and the object indicating the entertainment information such that all or part of the object indicating the entertainment information passes behind the object indicating the driving information during the movement, or part of the object indicating the entertainment information is overlapped with the back side of the object indicating the driving information after the movement. With this configuration, it is possible to intuitively recognize the content of the information displayed on the instrument panel display 1 while maintaining the safety in driving.

In addition, according to Embodiment 2, there is provided the operation detector 2c that detects the operation from the outside, and the information acquisition module 2a1 acquires the information corresponding to the operation detected by the operation detector 2c as the second information to be displayed on the instrument panel display 1.

With this configuration, it is possible to make the notification by displaying the information corresponding to the user operation on the instrument panel display 1.

Further, according to Embodiment 2, when the object indicating the driving information is displayed on the instrument panel display 1, the information acquisition module 2a1 acquires the second information to be displayed on the instrument panel display 1 at a set time lapse from the occurrence of the predetermined event. With this configuration, it is possible to cause the driver to accurately recognize the content of the event (the album after the change or the like).

Further, according to Embodiment 2, when the object indicating the driving information is displayed on the instrument panel display 1, the information acquisition module 2*a*1 acquires the second information to be displayed on the instrument panel display 1 in response to a change in the state of the predetermined function as the trigger.

With this, it is possible to make the notification by displaying on the instrument panel display 1 the information corresponding to the state change of the function irrespective of the user operation.

Embodiment 3

Figure 13:
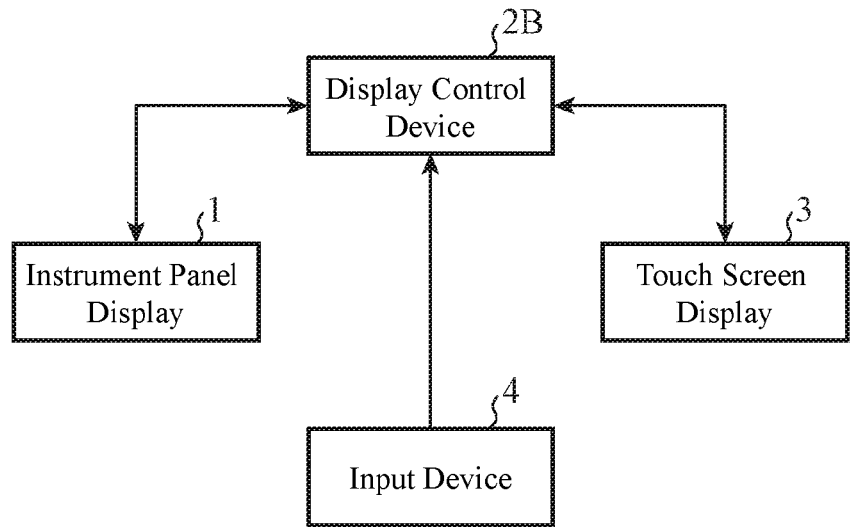
FIG. 13 is a block diagram showing a configuration of an information display system according to Embodiment 3 of the invention.

FIG. 13 is a block diagram showing a configuration of an information display system according to Embodiment 3 of the invention. In FIG. 13, the information display system according to Embodiment 3 is a system that is mounted in the vehicle and displays the driving conditions such as the speed of the vehicle and the gearshift information on the display screen, and is configured to include the instrument panel display 1, a display control device 2B, the touch screen display 3, and an input device 4. In this regard, the instrument panel display 1 is the same as that in FIG. 1 and the touch screen display 3 is the same as that in FIG. 7, and hence the description thereof will be omitted.

The input device 4 is a device for inputting the operation to the UI displayed on the instrument panel display 1, and an example thereof includes a steering switch that can be operated by the driver during driving.

The display control device 2B is a display device that is mounted in the vehicle and controls the display of the display screens of the instrument panel display 1 and the touch screen display 3.

In addition, the display control device 2B performs the control for displaying, among information items displayed on the instrument panel display 1, an information item corresponding to the input operation using the input device 4 on the touch screen display 3.

Figure 14:
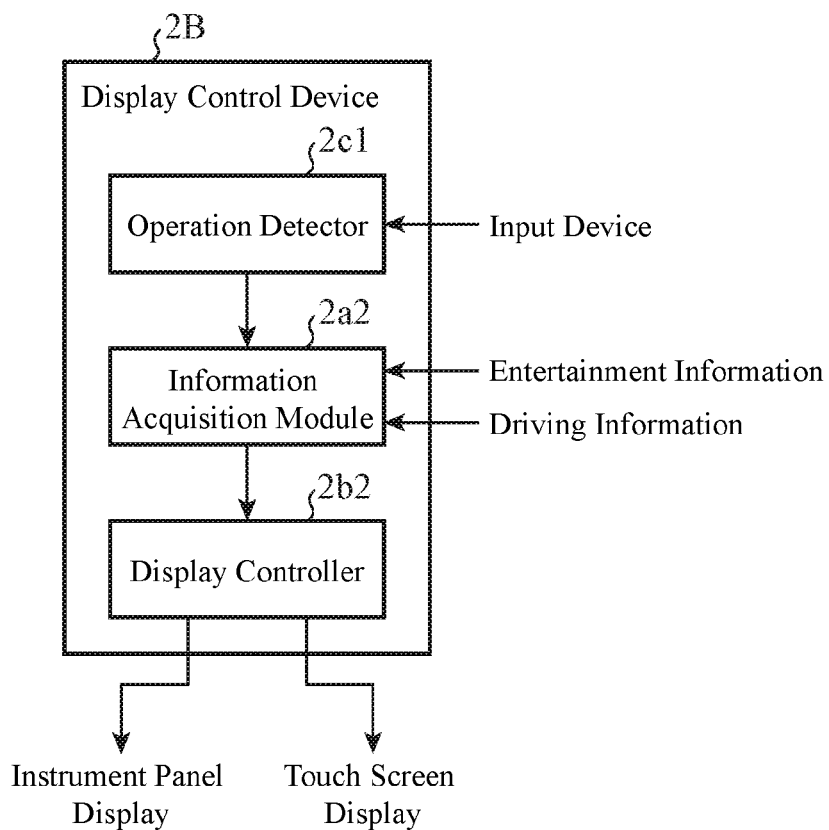
FIG. 14 is a block diagram showing a configuration of a display control device according to Embodiment 3.

FIG. 14 is a block diagram showing a configuration of the display control device according to Embodiment 3. As shown in FIG. 14, the display control device 2B includes an information acquisition module 2*a*2, a display controller 2*b*2, and an operation detector 2*c*1. The information acquisition module 2*a*2 is an information acquisition module that acquires the information to be displayed on the instrument panel display 1 and the touch screen display 3. For example, similarly to Embodiment 1, the information acquisition module 2*a*2 acquires the driving information inputted from the electronic control unit of the vehicle via the CAN bus as the information to be displayed on the instrument panel display 1, and outputs the information to the display controller 2*b*2.

The display controller 2*b*2 is a display controller that controls the display of the display screens of the instrument panel display 1 and the touch screen display 3.

For example, in the case where the information acquisition module 2*a*2 acquires warning information as the information to be displayed on the touch screen display 3 when the object indicating the driving information and the object indicating the warning information are displayed on the instrument panel display 1, the display controller 2*b*2 moves an object 1*b*3 indicating the warning information from the inside of the screen of the instrument panel display 1 to the outside of the screen such that all or part of the object 1*b*3 indicating the warning information passes behind the object 1*b*2 indicating the driving information, further moves the object 1*b*3 indicating the warning information from the outside of the screen of the touch screen display 3 to the inside of the screen, and displays the object 1*b*3.

The operation detector 2*c*1 is an operation detector that detects the input operation using the input device 4.

In addition, the operation detector 2*c*1 may detect the operation of the external equipment that is connected to the display control device 2B in a wireless or wired manner.

Next, an operation will be described.

Figure 15:
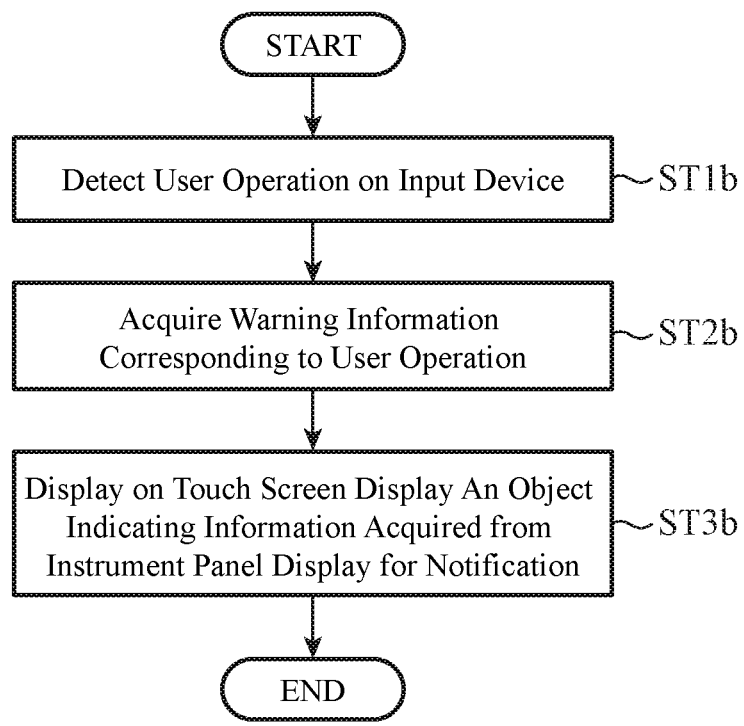
FIG. 15 is a flowchart showing an operation of the display control device according to Embodiment 3.

FIG. 15 is a flowchart showing the operation of the display control device according to Embodiment 3.

First, the operation detector 2*c*1 detects the user operation using the input device 4 (Step ST1*b*). Herein, the case where the object indicating the warning information displayed on the instrument panel display 1 is selected by using the input device 4 will be described as an example.

The information acquisition module 2*a*2 acquires the warning information displayed on the instrument panel display 1 as the information corresponding to the operation detected by the operation detector 2*c*1 (Step ST2*b*).

For example, by selecting a warning display image displayed on the instrument panel display 1, the information acquisition module 2*a*2 acquires the warning information corresponding to this.

In the case where the information acquisition module 2*a*2 acquires the warning information displayed on the instrument panel display 1 as the information to be displayed on the touch screen display 3 when the object indicating the driving information is displayed on the instrument panel display 1, the display controller 2*b*2 displays the object indicating the warning information on the touch screen display 3 for notification to the passenger of the vehicle (Step ST3*b*).

Figure 16:
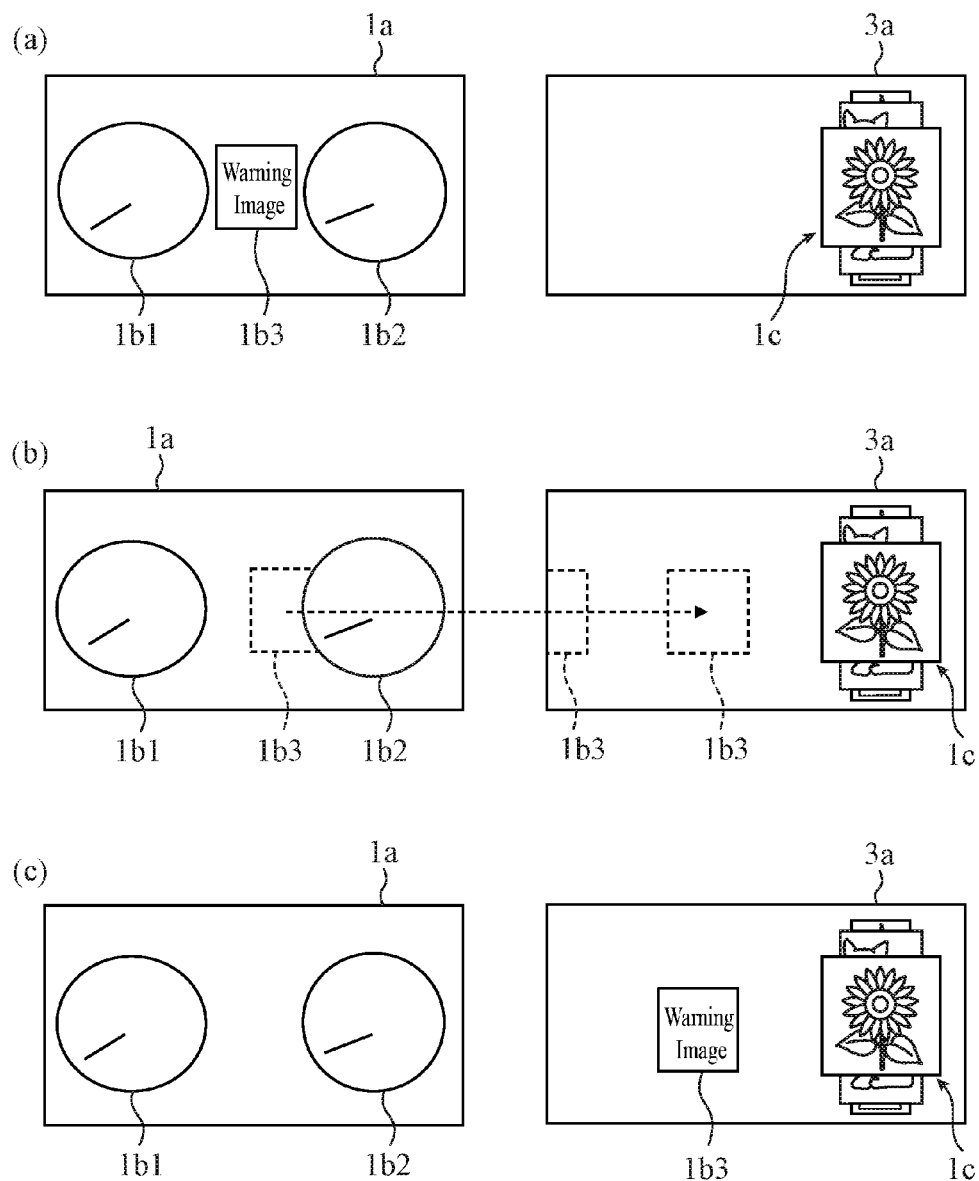
FIG. 16 illustrates views of a screen display in Embodiment 3.

FIG. 16 is a view showing the screen display in Embodiment 3, and shows a mode for displaying the warning information displayed on the instrument panel display 1 on the touch screen display 3. In FIG. 16(*a*), the display controller 2*b*2 displays the meter images 1*b*1 and 1*b*2 and the warning display image 1*b*3 on the screen 1*a* of the instrument panel display 1. In addition, the display controller 2*b*2 displays the playback album selection screen 3*a* for selecting the album to be played back on the touch screen display 3. At this point, when the driver selects the warning display image 1*b*3 by using the input device 4, the operation detector 2*c*1 detects this selection operation.

When the operation detector 2*c*1 detects the operation using the input device 4, the information acquisition module 2*a*2 acquires the warning information corresponding to the selection operation as third information to be displayed on the touch screen display 3.

In the case where the information acquisition module 2*a*2 acquires the warning information when the meter images 1*b*1 and 1*b*2 and the warning display image 1*b*3 are displayed on the screen 1*a* of the instrument panel display 1 in the manner described above, as indicated by an arrow in FIG. 16(*b*), the display controller 2*b*2 moves the warning display image 1*b*3 as the object indicating the warning information from the inside of the screen of the instrument panel display 1 to the outside of the screen, and moves the warning display image 1*b*3 from the outside of the screen of the touch screen display 3 to the inside of the screen.

In the screen of the instrument panel display 1, the display controller 2*b*2 displays the object 1*b*2 indicating the driving information and the warning display image 1*b*3 such that all of the warning display image 1*b*3 passes behind the object 1*b*2 indicating the driving information. In this regard, the display controller 2*b*2 may display the object indicating the driving information and the warning display image 1*b*3 such that part of the warning display image 1*b*3 passes behind the object indicating the driving information during the movement.

Thereafter, as shown in FIG. 16(*c*), the display controller 2*b*2 moves the warning display image 1*b*3 to the set position in the screen of the touch screen display 3, and displays the warning display image 1*b*3.

In this regard, the display controller 2*b*2 may search the screen of the touch screen display 3 for a space in which the entire warning display image 1*b*3 can be displayed and determine the space as the set position, or the display controller 2*b*2 may also determine a position specified by the user in advance as the set position.

The drive can intuitively recognize that the passenger monitoring the touch screen display 3 is notified of the information corresponding to the operation of the input device 4 by sighting a state in which the warning display image 1*b*3 moves over the two displays 1 and 3 that are physically spaced apart from each other while passing behind the existing objects (the meter images 1*b*1 and 1*b*2).

In addition, the objects (the meter images 1*b*1 and 1*b*2) of the driving information already displayed on the instrument panel display 1 do not change, and hence the screen layout is not significantly changed due to the update of the display content in which the warning display image 1*b*3 moves.

Consequently, the attention of the driver is not extremely spoiled due to the change of the screen layout so that it is possible to maintain the safety in driving.

It is noted that each of the meter images 1*b*1 and 1*b*2 and the warning display image 1*b*3 displayed on the instrument panel display 1 is information having a high priority in safe driving. Accordingly, the display controller 2*b*2 further compares the priorities of the objects with each other, and controls the display such that the object having a lower priority passes behind the object having a higher priority. In the above case, it is assumed that the priority of the warning display image 1*b*3 is lower than the priority of each of the meter images 1*b*1 and 1*b*2.

Thus, a method for setting the priority for the object indicating the information related to safety can be implemented by, e.g., setting the priority for each object in advance.

Thus, according to Embodiment 3, in the case where the information acquisition module 2*a*2 acquires the warming information as the information to be displayed on the touch screen display 3 when the objects 1*b*1 and 1*b*2 indicating the driving information and the warning display image 1*b*3 of the warning information are displayed on the instrument panel display 1, the display controller 2*b*2 moves the warning display image 1*b*3 of the warning information from the inside of the screen of the instrument panel display 1 to the outside of the screen such that all or part of the warning display image 1*b*3 of the warning information passes behind the object 1*b*2 indicating the driving information, further moves the warning display image 1*b*3 from the outside of the screen of the touch screen display 3 to the inside of the screen, and displays the warning display image 1*b*3. With this configuration, the driver can intuitively recognize that the information displayed on the instrument panel display 1 is displayed on the touch screen display 3 and another passenger is notified of the information. In addition, the object indicating the notification information is displayed so as to pass behind the object related to the safety, and hence it is possible to maintain the safety in driving.

It is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The display control device according to the invention is capable of the intuitive recognition of the content of the information displayed on the in-vehicle display while maintaining the safety in driving, and hence the display control device is suitable in the information display system that uses the instrument panel display mounted in the vehicle or the like.

EXPLANATIONS OF REFERENCE NUMERALS

1: instrument panel display,
1*a*, 3*a*: screen,
1*b*1, 1*b*2, 1*b*3: object indicating driving information,
1*c*: object indicating entertainment information,
2, 2A, 2B: display control device,
2*a*, 2*a*1, 2*a*2: information acquisition module,
2*b*, 2*b*1, 2*b*2: display controller, and
2*c*, 2*c*1: operation detector.

The invention claimed is:

1. A display control device mounted in a vehicle and controlling display of a display screen, the display control device comprising:
   a receiver that acquires information to be displayed on a first display device mounted in the vehicle; and
   a display controller that, in a case where the receiver acquires second information as the information to be displayed on the first display device when an object indicating first information is displayed on the first display device, moves an object indicating the second information from an outside of a screen of the first display device to an inside of the screen, and displays the object indicating the first information and the object indicating the second information such that all or part of the object indicating the second information passes behind the object indicating the first information during the movement, or part of the object indicating the second information is overlapped with a back side of the object indicating the first information after the movement,
   wherein, upon acquiring the second information and without user interaction, the display controller
      transforms a shape of the object indicating the second information,
      moves the display of the transformed object indicating the second information in the screen of the first display device such that part of the transformed object indicating the second information passes behind the object indicating the first information while maintaining the display content of the second information, thereafter, once display of the transformed object reaches a predefined position on the screen, restores the shape of the transformed object indicating the second information to its original shape, and
      displays the restored object indicating the second information.

2. The display control device according to claim 1, wherein the display controller transforms and moves the object indicating the first information such that the object indicating the first information retreats in response to approach of the object indicating the second information, and displays the object indicating the first information and the object indicating the second information such that part of the object indicating the second information is overlapped with the back side of the object indicating the first information after the transformation.

3. The display control device according to claim 1, wherein
the receiver acquires, as the information to be displayed on the first display device, information to be displayed on a second display device mounted in the vehicle and,
in a case where the receiver acquires the information being displayed on the second display device as the second information when the object indicating the first information is displayed on the first display device, the display controller moves the object indicating the second information from the outside of the screen of the first display device to the inside of the screen, and displays the object indicating the first information and the object indicating the second information such that all or part of the object indicating the second information passes behind the object indicating the first information during the movement, or part of the object indicating the second information is overlapped with the back side of the object indicating the first information after the movement.

4. The display control device according to claim 3, wherein, in a case where the receiver acquires third information as the information to be displayed on the second display device when the object indicating the first information and an object indicating the third information are displayed on the first display device, the display controller moves the object indicating the third information from the inside of the screen of the first display device to the outside of the screen such that all or part of the object indicating the third information passes behind the object indicating the first information, further moves the object indicating the third information from an outside of a screen of the second display device to an inside of the screen of the second display device, and displays the object indicating the third information.

5. The display control device according to claim 1, further comprising an operation detector that detects an operation from an outside, wherein the receiver acquires information corresponding to the operation detected by the operation detector as the second information.

6. The display control device according to claim 1, wherein the receiver acquires the second information at a set time lapse from occurrence of a predetermined event when the object indicating the first information is displayed on the first display device.

7. The display control device according to claim 1, wherein the receiver acquires the second information in response to a change in a state of a predetermined function when the object indicating the first information is displayed on the first display device.

8. The display control device according to claim 1, wherein the first information is information having a priority in safe driving higher than that of the second information.

9. An information display method of displaying information on first and second display devices mounted in a vehicle, the method comprising the steps of:
in an information acquisition module, acquiring information displayed on the second display device as second information to be displayed on the first display device when an object indicating first information is displayed on the first display device; and
in a display controller, moving an object indicating the second information acquired by the information acquisition module from an outside of a screen of the first display device to an inside of the screen, and displays the object indicating the first information and the object indicating the second information such that all or part of the object indicating the second information passes behind the object indicating the first information during the movement, or part of the object indicating the second information is overlapped with a back side of the object indicating the first information after the movement,
wherein, upon acquiring the second information and without user interaction, the display controller
transforms a shape of the object indicating the second information,
moves the display of the transformed object indicating the second information in the screen of the first display device such that part of the transformed object indicating the second information passes behind the object indicating the first information while maintaining the display content of the second information, thereafter, once display of the transformed object reaches a predefined position on the screen restores the shape of the transformed object indicating the second information to its original shape, and
displays the restored object indicating the second information.

10. An information display system comprising:
first and second display devices mounted in a vehicle:
receiver that acquires information to be displayed on the first and second display devices; and
a display controller that, in a case where the receiver acquires information displayed on the second display device as second information to be displayed on the first display device when an object indicating first information is displayed on the first display device, moves an object indicating the second information from an outside of a screen of the first display device to an inside of the screen, and displays the object indicating the first information and the object indicating the second information such that all or part of the object indicating the second information passes behind the object indicating the first information during the movement, or part of the object indicating the second information is overlapped with a back side of the object indicating the first information after the movement,
wherein, upon acquiring the second information and without user interaction, the display controller
transforms a shape of the object indicating the second information,
moves the display of the transformed object indicating the second information in the screen of the first display device such that part of the transformed object indicating the second information passes behind the object indicating the first information while maintaining the display content of the second information, thereafter, once display of the transformed object reaches a predefined position on the screen, restores the shape of the transformed object indicating the second information to its original shape, and displays the restored object indicating the second information.

\* \* \* \* \*